May 26, 1925.
C. H. MATRAVERS
DEVICE FOR TEACHING ENGLISH
Filed June 15, 1923
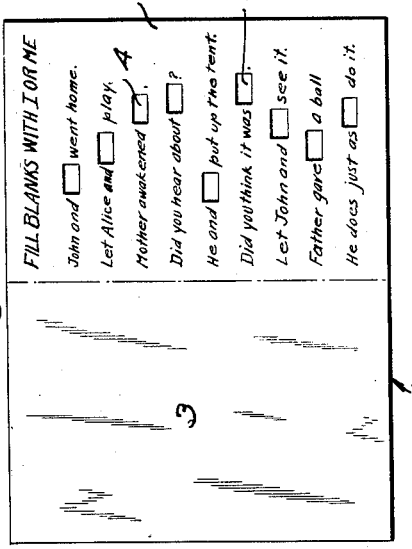
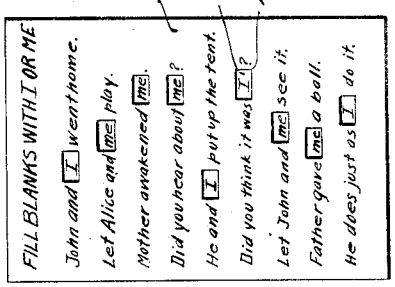
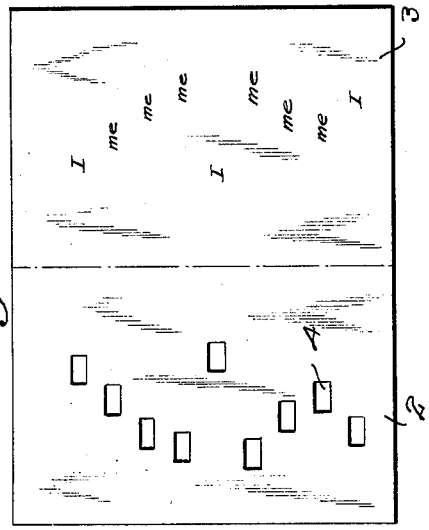
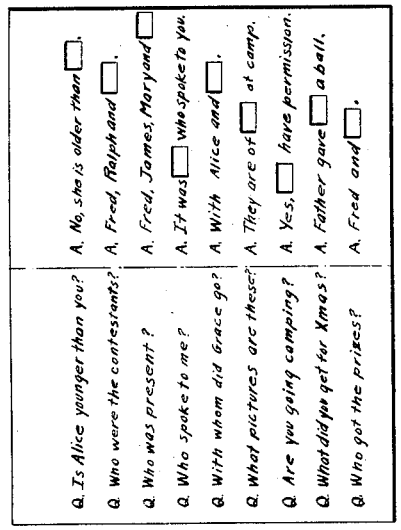
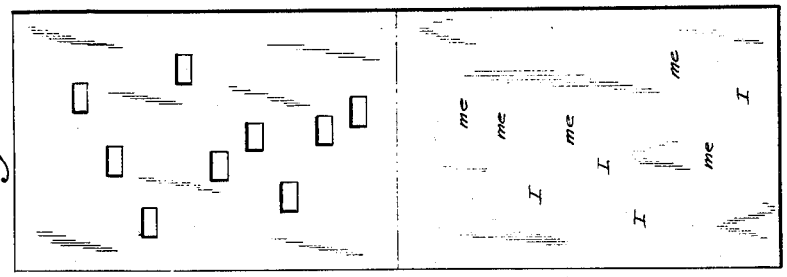
Inventor
C. H. Matravers
By Young and Young, Attorneys Patented May 26, 1925.

1,539,397

UNITED STATES PATENT OFFICE.

CHESTER H. MATRAVERS, OF MANITOWOC, WISCONSIN.

DEVICE FOR TEACHING ENGLISH.

Application filed June 15, 1923. Serial No. 645,679.

*To all whom it may concern:*

Be it known that I, CHESTER H. MATRAVERS, a citizen of the United States, and resident of Manitowoc, in the county of Manitowoc and State of Wisconsin, have invented certain new and useful Improvements in Devices for Teaching English; and I do hereby declare that the following is a full, clear, and exact description thereof.

My invention relates to improvements in educational appliances and particularly to that type adapted for teaching various exercises in language, or in any subject, wherein it is desired to impress upon the pupil the correct form.

Briefly speaking my invention relates to a device adapted for correcting language errors and consists of a folder, the first leaf of which has printed thereon certain sentences with the omission of the particular grammatical form to be emphasized for study. The second leaf of the folder has printed thereon the omitted grammatical forms necessary to complete the sentences carried by the first leaf, and these forms are adapted to show through openings arranged in the first leaf and formed at the point where the grammatical form was omitted in each sentence.

In the accompanying drawings,

Figure 1 is a view showing the face of the folder, the same having thereon certain incomplete sentences.

Figure 2 is a view showing the inner face of the folder shown in Fig. 1, one leaf of which has thereon certain words adapted to complete the thought of the sentences carried by the face.

Figure 3 is a view showing the second leaf folded to complete the sentences carried by the first leaf.

Figure 4 is a view similar to Figure 1 showing the second leaf provided with questions, the answers of which are carried by the second leaf, the same having omitted therein the form to be studied, and Figure 5 is a slightly modified form of my invention.

Referring to the drawings in detail, wherein like reference characters denote corresponding parts throughout the several views, the numeral 1 indicates generally a card which may be made of pasteboard or the like, and may be made of any suitable construction, preferably of some tough paper capable of withstanding considerable rough handling.

The card 1 is creased in its intermediate portion and folded thereon to provide a folder having first and second sheets, 2 and 3 respectively. As disclosed in Figure 1 the first sheet or leaf has printed thereon certain sentences, each of which has a word omitted and at the point where this omission occurs I have provided oblong openings 4.

The second leaf of the folder has printed on its inner face the omitted words in each sentence and so positioned that they register with the openings 4 arranged in the first leaf of the folder, when the two sheets are folded, as disclosed in Figure 3 of the drawings.

Having thus described the preferred form of my invention it will be fully apparent that the same gives opportunity for a combination of both visual and auditory instruction in the correction of errors which are so common in the study of the English language.

In the use of the folder in the auditory drill the same may be done in several ways: for instances, the second leaf is dropped while the pupil reads aloud, assisting or correcting himself when necessary by supplying the omitted form by holding the second leaf in contact with the first so that the proper word may be viewed through the opening in the first leaf. Furthermore, in group reading a blank sheet may be inserted between the two parts of the folder so that the drill may be conducted independently of the correct answers.

In the visual instruction, a sheet of paper is placed between the two parts of the folder and the pupil completes the sentences by writing on the paper, through the openings. After the exercise is completed the paper is removed and the same is corrected with the correct sentence which appears before him.

In Figure 4, I have shown a folder similar to that previously described, with the exception that the outer face of the second leaf has thereon questions, the answers of which are carried by the first leaf and each having a word omitted which is supplied by the inner face of the second leaf when the two are folded together.

In Figure 5, I have shown two parts of the folder being connected at the upper end of the first leaf, otherwise the folder remains the same as that disclosed in Figure 1.

From the above description it will be apparent that my invention may be used in numerous ways and is not limited to the study of the subject herein used for a purpose of illustration, but may be applicable to the study of any subject desired. The main purpose being to provide a set of cards or folders having thereon certain subjects in which common errors are made.

Having thus fully described my invention, what I claim as new and desire to secure by Letters Patent, is:—

A device of the class described having two parts connected together, certain incomplete subject matter carried by one part and matter rendering the same complete carried by the other part, openings in the first part where the matter is incomplete and through which the matter carried by the second part is visible, said parts adapted to receive therebetween a blank record sheet upon which insertions are made through the openings to render the matter carried by the first part complete, and said sheet adapted to be removed therefrom and corrected by the association of the first part with the second part.

In testimony that I claim the foregoing I have hereunto set my hand at Manitowoc, in the county of Manitowoc and State of Wisconsin.

CHESTER H. MATRAVERS.